United States Patent [19]
Ciais et al.

[11] Patent Number: 5,159,809
[45] Date of Patent: Nov. 3, 1992

[54] HIGHLY ADAPTABLE COMBINED PROPULSION ENGINE FOR AN AIRCRAFT OR A SPACE-GOING AIRPLANE

[75] Inventors: Jean-Pierre Ciais, Blanquefort; Eric Hermant, Vernon, both of France

[73] Assignee: Societe Europeenne de Propulsion, Suresnes, France

[21] Appl. No.: 630,088

[22] Filed: Dec. 19, 1990

[30] Foreign Application Priority Data

Dec. 21, 1989 [FR] France .................. 89 17007

[51] Int. Cl.⁵ .............................. F02K 9/00
[52] U.S. Cl. ........................ 60/225; 60/244
[58] Field of Search ............... 60/225, 244, 245, 246

[56] References Cited

U.S. PATENT DOCUMENTS

| | | | |
|---|---|---|---|
| 2,673,445 | 3/1954 | Bruckmann | 60/225 |
| 2,960,824 | 11/1960 | Plummer | 60/225 |
| 3,030,771 | 4/1962 | Hopper | 60/246 |
| 3,049,876 | 8/1962 | Connors | 60/35.6 |
| 3,138,921 | 6/1964 | Prince, Jr. | 60/35.6 |
| 3,192,712 | 7/1965 | Nash et al. | 60/35.6 |
| 3,802,190 | 4/1974 | Kaufmann | 60/225 |
| 4,461,145 | 7/1984 | Stephens | 60/226.3 |
| 5,052,176 | 10/1991 | Labatut et al. | 60/225 |

FOREIGN PATENT DOCUMENTS

| | | |
|---|---|---|
| 0313194 | 4/1989 | European Pat. Off. |
| 0403372 | 12/1990 | European Pat. Off. |
| 3703835 | 8/1988 | Fed. Rep. of Germany |
| 1064358 | 5/1954 | France |
| 1508093 | 1/1968 | France |
| 1586188 | 2/1970 | France |
| 2568316 | 1/1986 | France |
| 52-56209 | 5/1977 | Japan |
| 1026068 | 4/1966 | United Kingdom |
| 2196392 | 4/1988 | United Kingdom |
| 2205360 | 12/1988 | United Kingdom |

OTHER PUBLICATIONS

"Nozzle Concepts for", Astronautics and Aeronautics, vol. 13, No. 6, Jun. 1975, New York, pp. 22–27.

Primary Examiner—Richard A. Bertsch
Assistant Examiner—Howard R. Richman
Attorney, Agent, or Firm—Weingarten, Schurgin, Gagnebin & Hayes

[57] ABSTRACT

The combined propulsion engine comprises an air-breathing jet engine and a non-air-breathing rocket engine, the jet engine comprising an air inlet device and an external nozzle which, in association with a central body, defines an air-breathing combustion chamber, while the rocket engine comprises a non-air-breathing annular combustion chamber and at least one turbo pump for feeding it with propellant. The combustion chamber of the rocket engine is disposed inside a central body towards the rear thereof and is situated at the downstream end of the air-breathing combustion chamber, the rocket engine combustion chamber being itself delimited by a streamlined portion extending the central body and constituting a spike which penetrates into the throat of the external nozzle while ensuring aerodynamic continuity for the stream of combustion gases leaving the air-breathing combustion chamber. Means are provided for modifying the axial position of the external nozzle of the jet engine in order to adapt the section through the throat of said nozzle for passing the stream of combustion gases from the air-breathing combustion chamber to various different internal and external operating conditions of the engine, the air-breathing jet engine and the non-air-breathing rocket engine being capable of operating alternately or simultaneously, depending on the stage of a flight.

30 Claims, 6 Drawing Sheets

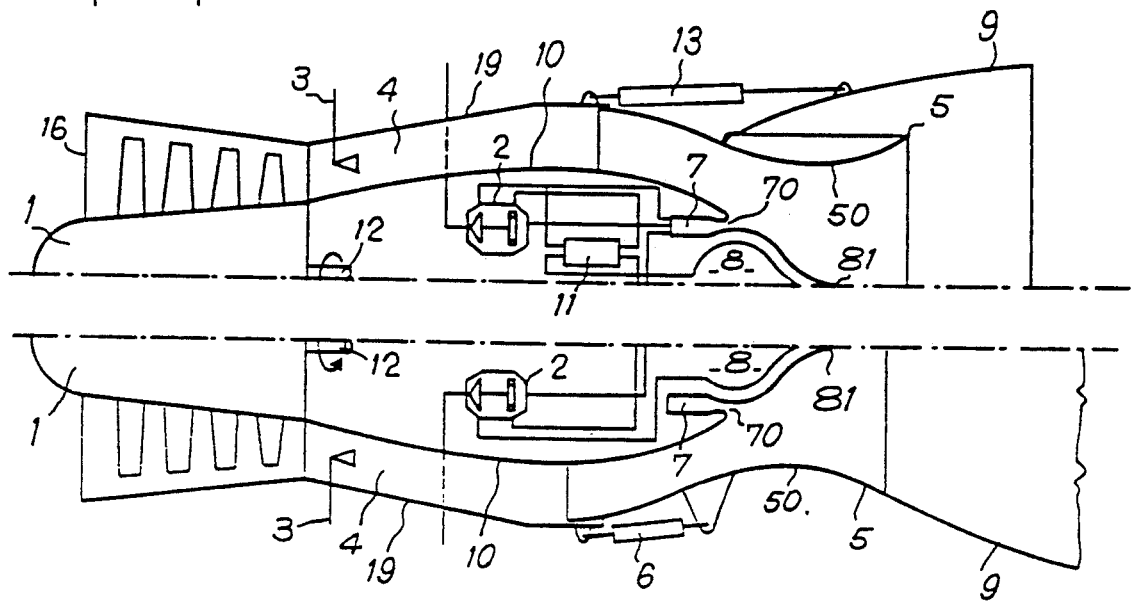
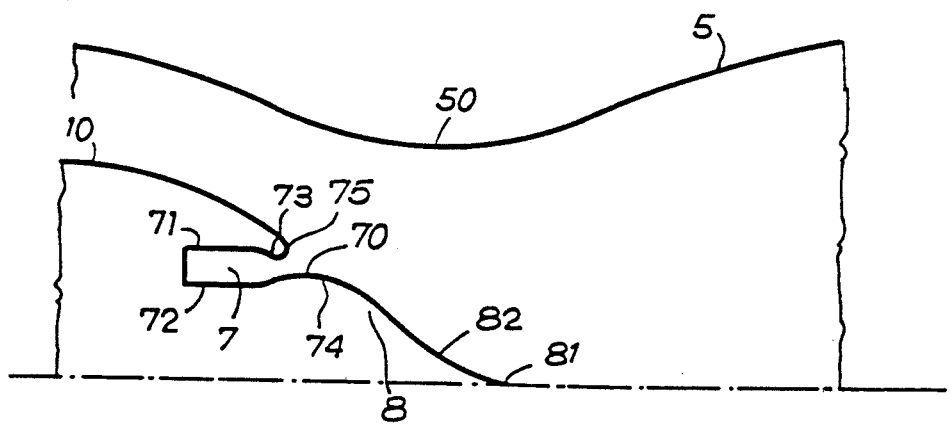

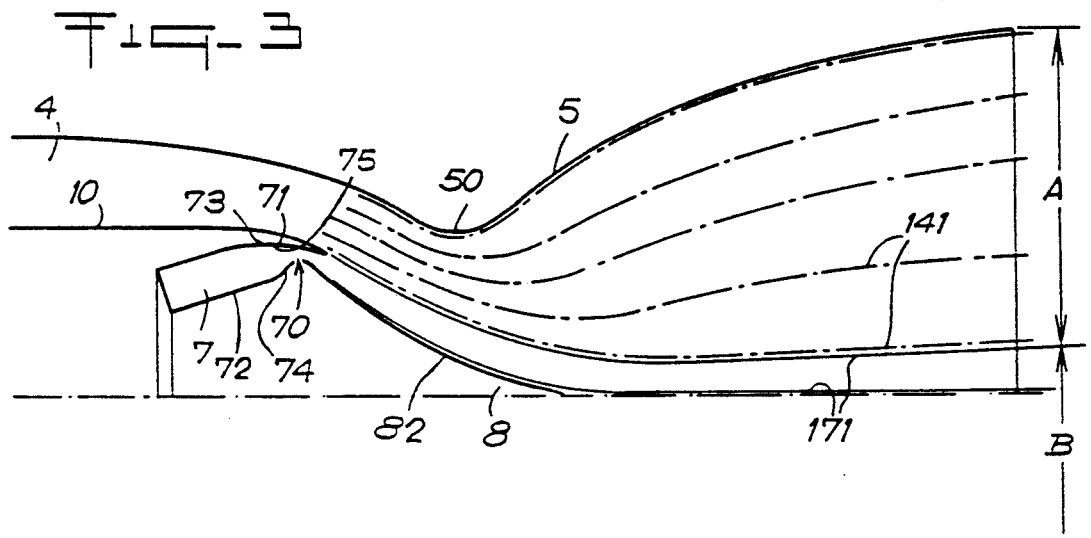
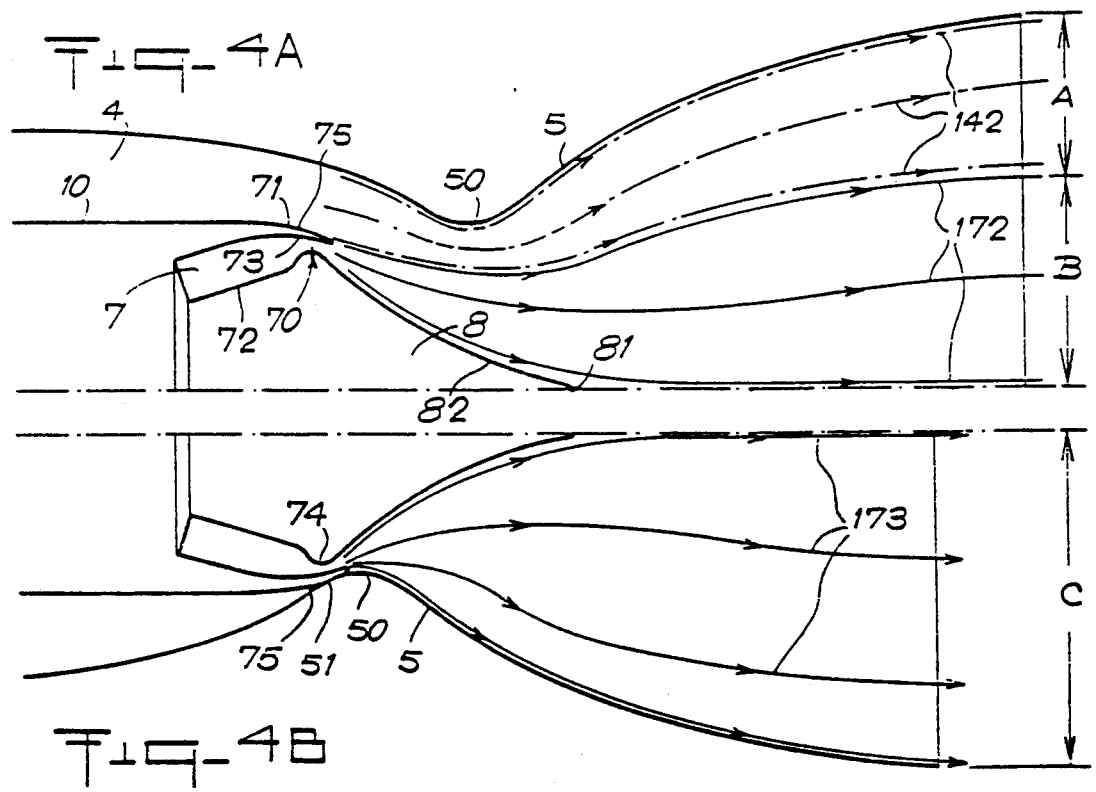

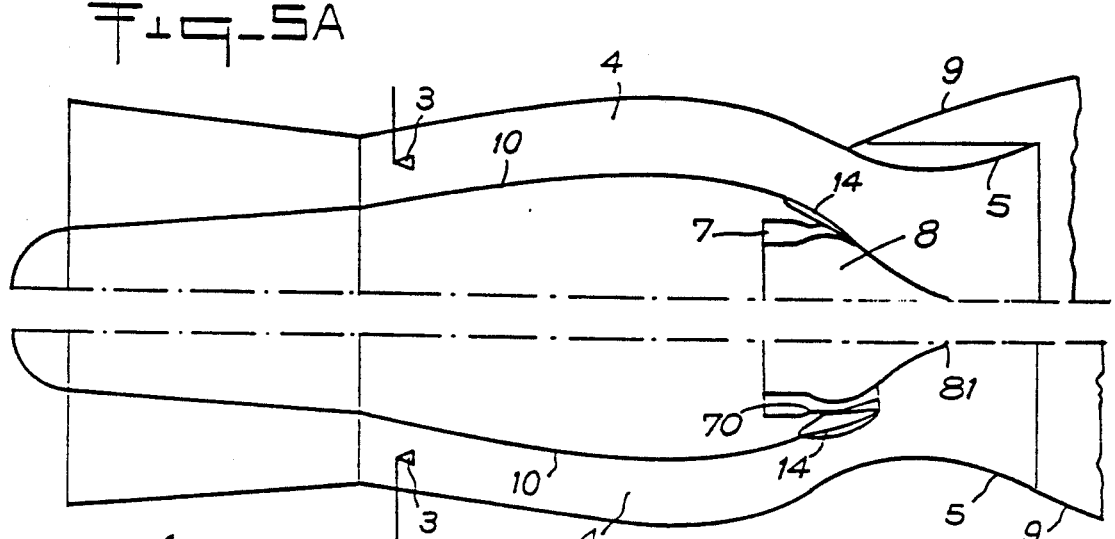
Fig-5A
Fig-5B
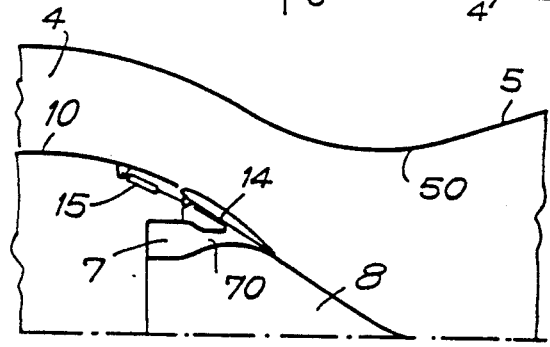
Fig-6A
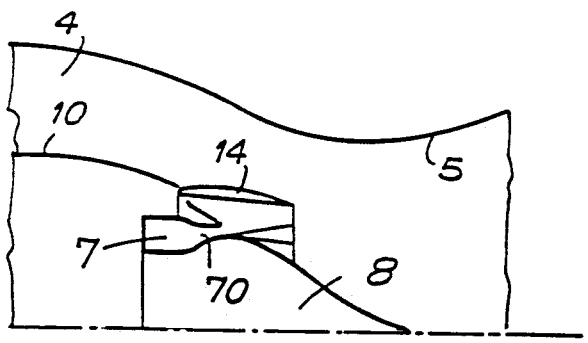
Fig-6B
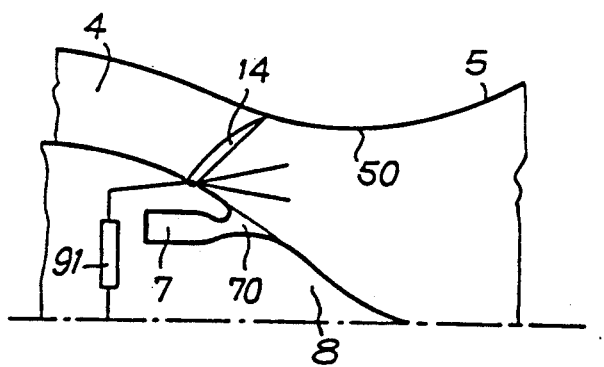
Fig-6C

HIGHLY ADAPTABLE COMBINED PROPULSION ENGINE FOR AN AIRCRAFT OR A SPACE-GOING AIRPLANE

The present invention relates to a highly adaptable combined propulsion engine for an aircraft or a space-going airplane, the engine comprising a jet engine for operating in air-breathing manner in the atmosphere and a rocket engine having liquid or gaseous propellants for operating in non-air-breathing manner in space, the jet engine comprising an air inlet device and an external nozzle which, in association with a central body, defines an air-breathing combustion chamber having an air-breathing stream of combustion gases passing therethrough, and the rocket engine comprising a non-air-breathing annular combustion chamber and at least one turbo pump for feeding the annular combustion chamber with propellant.

BACKGROUND OF THE INVENTION

In general, a combined propulsion engine or more simply a "combined engine" is constituted by a propulsion system associating either simultaneously or successively an air-breathing engine and a rocket engine within the same device. In a combined engine, oxygen from the air is used to burn fuel in an air-breathing jet engine during a portion of a flight, whereas during another portion of the flight a different oxidizer, carried on board the vehicle, is used within the rocket engine. The rocket engine may operate on its own, or else during a portion of the flight it may operate simultaneously with the air-breathing jet engine.

Combined engines have already been made for propelling missiles. In this case, a solid fuel engine is used to launch and accelerate the missile. The engine then changes into a ram jet making use of oxygen in the air for cruising flight.

Proposals have already been made to implement combined engines for supersonic transport aircraft, and for shuttles or other space vehicles for the purpose of reducing the mass of oxidizer carried by the vehicle, but no such project has yet been implemented.

In this application to space-going aircrafts or vehicles, air is generally used in gaseous form. It is compressed in a compressor analogous to that of a turbojet and it feeds a combustion chamber in which fuel is burnt. The hot gases are then ejected via a nozzle.

Beyond a certain speed, and providing the geometry of the air stream is appropriately adapted, the engine operates as a ram jet (its compressor then "freewheeling"). For non-air-breathing operation, the engine includes a combustion chamber of the type found in a rocket engine together with various pumps and other accessories for feeding the chamber both with fuel and with oxidizer. This chamber is situated inside the air stream of the turboramjet and behind its compressor-turbine portion. The nozzle from this combustion chamber makes use of components that it shares with the nozzle of the air-breathing stream.

The drawback of this device lies in the fact that in operation in turbo jet mode or in ram jet mode, the rocket combustion chamber must be closed by means of a streamlined fairing so as to avoid disturbing flow in the air-breathing stream. In addition, if the fairing is ejected for rocket mode operation, then it is not possible to return to turbo jet or ram jet mode without a major maintenance operation requiring a new fairing to be installed. Finally, the requirement to be able to adapt the section of the throat in the air-breathing nozzle means that the nozzle must be capable of considerable displacement relative to the central body which then acts as a section-varying needle or plunger.

Proposals have also been made, in Document JP-A-52-56209 to provide an air-breathing rocket propulsion system using liquid propellants, the system comprising at least one annular rocket chamber with a projecting tip and placed upstream from the combustion stream of a ram jet, i.e. upstream from the throat of the ram jet nozzle, thereby enabling combined operation to take place in which an entrainment effect occurs on the air taken from outside, with this air being mixed with the initially supersonic gases of the rocket nozzle associated with the rocket chamber. The ejection pressure of the rocket nozzle is thus brought close to that of the air in the mixing zone, and the geometry of the rocket nozzle enables the stream of air and the stream of gases ejected by the rocket to travel in parallel while mixing them with a minimum of losses. In this embodiment, the tapering central body of the spike type delimiting the annular rocket chamber is terminated in a zone of subsonic flow upstream from the throat of the ram jet nozzle. Only two modes of operation are possible: rocket mode only, and combined ram jet and rocket mode.

The present invention seeks to remedy the above-mentioned drawbacks and to provide a combined propulsion engine capable of operating in five different operating modes, namely: air-breathing mode, non-air-breathing mode, and combined mode, with air-breathing mode being either turbo jet mode or ram jet mode, the engine being capable of changing from one mode of operation to another in reversible manner without transient modes giving rise to significant excess stresses and without it being necessary to eject any fairing or the like, with each operating mode being adjustable to flight conditions.

The present invention also seeks to provide a combined propulsion engine having satisfactory efficiency in each of its possible operating modes and enabling thrust to be adapted on a continuous basis to mission requirements and to flight conditions regardless of altitude.

The invention also seeks to make it possible to adapt thrust on a continuous basis to requirements, and in particular to make it possible to operate simultaneously in rocket mode and in turbo jet mode in order to obtain maximum thrust, e.g. during take-off or when changing gradually from air-breathing mode to non-air-breathing mode so as to ensure continuous and constant thrust on leaving the dense layers of the atmosphere.

Another object of the invention is to guarantee continuity in the streams of gases in combustion and to guarantee flow mixing with minimum turbulence for the various possible modes of operation so that in spite of its highly adaptable nature the engine retains high efficiency.

SUMMARY OF THE INVENTION

These objects are achieved by means of a combined propulsion engine for an aircraft or a space-going aircraft of the type defined at the beginning of the description, in which the annular combustion chamber of the rocket engine is disposed inside the central body of the jet engine, is situated in the portion downstream from the air-breathing combustion chamber in the rear portion of the central body, and is itself delimited by a streamlined central body portion extending the central body of the air-breathing combustion chamber to constitute a spike which penetrates into the throat of the external nozzle while ensuring aerodynamic continuity of the stream of combustion gases from the air-breathing combustion chamber, and in which means are provided for modifying the axial position of the external nozzle of the jet engine in order to adapt the flow section for the stream of combustion gases from the air-breathing combustion chamber through the throat of said nozzle to different internal and external operating conditions of the engine, the air-breathing jet engine and the non-air-breathing rocket engine being capable of operating alternately or simultaneously in combined operation, in different stages of flight.

The jet engine operating in air-breathing mode may comprise a ram jet, a turbo jet, or a turbo rocket constituted by a turbo jet whose turbine is powered from a separate non-air-breathing gas generator.

The jet engine operating in air-breathing mode may also comprise a turbo jet capable of operating as a ram jet by switching off the power supply to the turbine or turbo compressor of the turbo jet, thereby leaving the compressor to rotate freely as driven by the incoming air.

The combined engine of the invention may operate alternately or simultaneously in air-breathing mode and in non-air-breathing mode and it maintains satisfactory efficiency in each operating mode by ensuring continuity in the combustion gas streams for each mode.

In particular, the extent to which the annular chamber of the rocket motor is opened is adapted to the width of the air-breathing combustion chamber so as to obtain flow mixing with minimum turbulence.

It may be noted that the various advantages of operating in combined mode and of reversibility between the various operating modes include the possibility of using the rocket motor to provide boost thrust during take-off and also the possibility of using the rocket motor simultaneously with ram jet mode operation, e.g. when the vehicle reaches high altitude and high speed with thrust from the ram jet falling off, thereby ensuring that total thrust from the engine is kept relatively constant.

Combined mode operation makes it possible to keep thrust continuously adapted to requirements at all times. In addition, combined mode operation serves to reduce the stroke of the variable geometry device constituted by the moving nozzle since the non-air-breathing gas flow can be used to create artificial variation in the throat section of the external nozzle of the air-breathing stream.

Thus, in accordance with a particular feature, the combined propulsion engine of the present invention includes means for modulating the flow rate through the jet engine so as to adapt the flow section for the air-breathing stream through the throat of the external nozzle to the conditions of non-air-breathing combustion occupying a predetermined section in the throat of the external nozzle of the air-breathing stream, so as to permit the gases from the air-breathing combustion chamber to occupy only that section which is strictly necessary as a function of operating conditions external to the engine.

The means for modulating the flow rate of the rocket engine consist in adjusting the pressure and the flow rate of the gases injected into each turbine of a turbo pump for feeding the engine with propellant, principally by means of feed valves for the turbines.

The disposition of the present invention makes it possible to adapt thrust continuously to mission requirements and to flight conditions while retaining satisfactory efficiency.

Advantageously, the external air-breathing nozzle is axially adjustable over a range enabling the non-air-breathing mode of operation on its own to cause the jet of gases from the non-air-breathing combustion chamber to reach the wall of the external nozzle tangentially, thereby preventing the appearance of hot points and of shock waves.

Further, and preferably, the air-breathing nozzle is axially adjustable over a range enabling the air-breathing stream to be closed off during non-air-breathing operation mode on its own, thereby preventing hot gases from flowing back into the air-breathing combustion chamber.

In a particular embodiment, the combined engine includes a ring of moving flaps loosely mounted at the outlet from the annular chamber of the rocket engine in order to close off the rocket engine during jet engine operation on its own, whereas during combined operation or during non-air-breathing operation on its own the flaps are opened by the pressure difference between the inner and outer faces of the flaps.

In this case, it is also possible to provide a shock absorber device associated with the loosely mounted flaps to prevent vibrations, together with small actuators to close the flaps when the engine is stopped.

In another possible embodiment, the combined engine comprises a ring of moving flaps actuated by actuators and mounted at the outlet from the annular chamber of the rocket engine to close said outlet during jet engine operation on its own, thereby preventing hot gases from flowing back from the air-breathing stream and to enable the flaps to be disposed in intermediate open positions when operating in combined mode in order to minimize interactions between the air-breathing flow and the non-air-breathing flow, thereby contributing to adapting the section of the throat of the external nozzle through which the air-breathing stream flows.

In this case, when operating in rocket engine only mode, the flaps may be put in the fully open position in order to close off the air-breathing combustion chamber through which the air-breathing stream flows, thereby avoiding hot gas backflow.

The presence of a ring of loosely mounted moving flaps has the effect of limiting turbulence where the air-breathing and non-air-breathing flows meet each other, thereby increasing efficiency.

By acting on the section reserved for the air-breathing flow, the presence of a ring of controlled flaps has effects similar to those of moving the nozzle. This ring of flaps thus makes it possible to reduce the stroke of the moving nozzle, thereby reducing costs and increasing reliability.

In another particular embodiment, the combined engine of the invention includes means for sweeping the air-breathing stream running through the air-breathing combustion chamber while operating in rocket engine only mode with a flow of low temperature gas in order to cool the zone of impact of the expanding jet leaving the combustion chamber of the rocket on the wall of the external air-breathing nozzle, and in order to facilitate adhesion of said jet on said wall.

The means for obtaining a low temperature sweeping gas flow may comprise means for injecting a flow of fuel into the air-breathing stream, which fuel may optionally be partially heated by the rocket engine, or else said means may comprise means for injecting gases that come from the turbines of the turbo pumps of the rocket engine into the air-breathing stream.

The combined propulsion engine may also include means for use in air-breathing only operation mode to sweep the combustion chamber of the rocket engine with a low temperature gas flow in order to prevent backflow of hot gases from the air-breathing stream.

In another possible embodiment, the streamlined central body with a projecting tip delimitating the annular combustion chamber of the rocket engine is slightly trucated, and a cooling circuit is disposed inside said streamlined central body.

The truncated portion of the central body delimitating the annular combustion chamber of the rocket engine may include an ejection nozzle for gas flows that are trapped or lost, providing the pressures thereof are higher than the pressure existing in the nozzle at the end of the central body. These flows may be collected in an axial duct passing through the central body.

However, it is preferable for the projecting tip delimitating the annular combustion chamber of the rocket engine to be made, at least in part, from thermostructural composite materials.

In this case, the central body is thus not truncated and is capable of operating without any additional incorporated cooling device, given the characteristics of the materials used.

The annular combustion chamber of the rocket engine may be made up from a plurality of segments, thereby facilitating manufacture and tuning of said chamber.

In this case, in a first particular embodiment, the annular combustion chamber is constituted by a plurality of individual chambers each having a section in the form of a circular arc, said individual chambers being disposed substantially contiguously in a ring around the axis of the central body.

In another particular embodiment, the annular combustion chamber is constituted by a plurality of individual chambers each elliptical in section, which chambers are disposed substantially contiguously in a ring around the axis of the central body.

In yet another particular embodiment, the annular combustion chamber is constituted by a plurality of individual chambers each circular in section, which chambers are disposed substantially contiguously in a ring around the axis of the central body.

Advantageously, the individual chambers of the segmented annular combustion chamber are controlled individually and selectively so that during certain stages of flight only a fraction of the individual chambers of the segmented annular combustion chamber are in operation.

The rocket engine may operate in a "divided flux", an "integral flux", or an "expander" type cycle. Given the very high heat flows through the walls of the annular combustion chamber, an "expander" type rocket engine is particularly suitable for a combined propulsion engine of the present invention.

In a particularly advantageous embodiment, the annular combustion chamber of the non-air-breathing rocket engine is delimitated by an outer first frustoconical wall and by an inner second frustoconical wall, said walls being coaxial and defining an annular chamber having a downstream portion which is further from the axis of the engine than its upstream portion, the outer first frustoconical wall extends tangentially at its downstream portion in the form of a wall portion forming the outer wall of the rocket engine nozzle and being concave towards the inside of the nozzle, and the inner second frustoconical wall extends at its downstream portion in the form of a wall portion projecting towards the inside of the annular chamber and forming the inner wall of the rocket engine nozzle by presenting a convex face towards the inside of the nozzle.

In this case, the tapering central body extending the central body of the air-breathing combustion chamber and constituting a spike comprises both said internal second frustoconical wall for which said projecting wall portion constitutes the inner wall of the rocket engine nozzle and a tip-forming curved wall having a concave face facing outwards and situated in the throat of the external air-breathing nozzle.

The central body of the air-breathing combustion chamber terminates at its downstream end in a portion curving towards the axis of the engine and connected to the free downstream end of the wall portion constituting the outer wall of the rocket engine nozzle.

These particular configurations make it possible to obtain the best distribution of gas flows both in rocket-only mode and in combined mode where the air-breathing flow may be the majority flow or where the non-air-breathing flow may be the majority flow.

The combined propulsion engine of the present invention may thus have numerous variants. Thus, it is possible to use a compressor in the jet engine having variable-pitch blades with operating parameters (speed, flow rate, power) that can be modified depending on the stage of the flight.

In some particular applications, the jet engine of the combined engine may include a compressor having contrarotating rotors.

Advantageously, and in order to obtain satisfactory efficiency from the engine both in the atmosphere and in space, the combined engine includes a deployable diverging portion connected to the air-breathing external nozzle and provided with means for controlling the deploying of the deployable diverging portion.

BRIEF DESCRIPTION OF THE DRAWINGS

Embodiments of the invention are described by way of example with reference to the accompanying drawings, in which:

FIGS. 1A and 1B are diagrams in axial section through one example of a combined propulsion engine of the present invention, with the top axial half-section of FIG. 1A corresponding to an operating mode for low altitude flight and with the bottom axial half-section of FIG. 1B corresponding to an operating mode for high altitude flight;

FIG. 2 is an axial half-section through the engine of FIG. 1 showing a particular embodiment of a special nozzle shape for the rocket engine and the air-breathing engine;

FIG. 3 is an axial half-section view of the FIG. 1 engine showing another particular embodiment of a special nozzle for the rocket engine and the air-breathing engine, with a gas flow distribution being shown for combined operation mode with a majority air-breathing flow;

FIGS. 4A and 4B are axial section views analogous to FIG. 3 but showing gas flow distributions corresponding in the top axial half-section of FIG. 4A to combined mode operation with majority non-air-breathing flow, and in the bottom axial half-section of FIG. 4B to rocket mode operation only;

FIGS. 5A and 5B are diagrammatic axial section views showing a variant embodiment of the combined propulsion engine of FIG. 1 in which a ring of moving flaps is disposed at the outlet from the annular combustion chamber of the rocket engine, the moving flaps being shown in their closed position in the top half-section of FIG. 5A and in their open position in the bottom half-section of FIG. 5B;

FIGS. 6A, 6B, and 6C show detail of FIGS. 5A and 5B with a moving flap being shown in three different positions corresponding respectively to a mode comprising air-breathing operation only, a combined operation mode, and a mode comprising non-air-breathing operation only;

DETAILED DESCRIPTION

Figure 7:
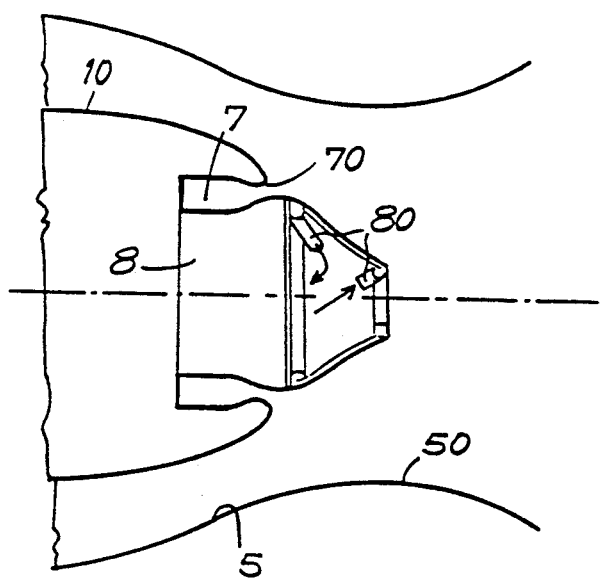
FIG. 7 is an axial section through a portion of the engine of FIG. 1 corresponding to a particular embodiment in which the central body of the rocket engine is slightly truncated and is provided with an incorporated cooling system.

With reference to FIG. 1, a particular embodiment of a combined propulsion engine of the invention comprises an outer shell 19 containing an air compressor 1 placed at the front of the propulsion assembly and fed from an air inlet 16, and a central body 10 which, together with the outer shell 19, delimitates a combustion chamber 4 which is fed with air under pressure by the compressor 1 and which includes fuel injector devices 3 in order to constitute an air-breathing jet engine.

The compressor 1 may be driven by a conventional air-breathing turbine. However, in a turbo rocket system, as shown in FIG. 1, the compressor 1 may be driven by a shaft 12 from an internal turbine (not shown) disposed inside the central body 10 and driven, for example, by a non-air-breathing gas generator 11 likewise disposed inside the central body 10. FIG. 1 shows a gas generator 11 and a turbo pump 2 for feeding both a rocket combustion chamber 7 and the gas generator 11 with propellant. However the gas generator 11 may be omitted if the combined propulsion engine operates in a preferred conventional cycle known as the "expander" cycle.

The hot gases obtained in the combustion chamber 4 of the assembly constituting a turbo jet or a turbo rocket are accelerated and ejected through a nozzle 5 whose axial position is adjustable and which extends the shell 19 to the rear of the propulsion assembly.

The compressor 1 and its associated components may be omitted if the jet engine is constituted by a ram jet only having an air inlet 16, a combustion injector device 3, an air-breathing combustion chamber 4, and a nozzle 5.

A jet engine of the turbo jet or turbo rocket type as shown in FIG. 1 may also operate as a ram jet. In this case the compressor 1 is allowed to freewheel and air is compressed by adapting the geometry of the air stream formed from the air inlet orifice 16. This air feeds the same combustion chamber 4 and the nozzle 5 is positioned so as to adapt the geometry of the stream to ram jet mode operation.

The nozzle 5 is extended by a deployable diverging portion 9 enabling the nozzle 5 to be adapted to high altitude operation, the operating domain where ram jet mode is particularly suitable.

The main nozzle 5 whose axial position is adjustable co-operates with an activation device 6 which may be constituted, for example, by actuators. Likewise, the deployable diverging portion 9 co-operates with an extension device 13 which may likewise include actuators.

The nozzle 5 and the deployable diverging portion 9 are shown in the top axial half-section of FIG. 1A in their positions corresponding to low altitude flight. In this case, the deployable diverging portion 9 is in its non-active position and the nozzle 5 has a throat 50 situated in a rear position. In the bottom axis half-section of FIG. 1B, the nozzle 5 and the deployable diverging portion 9 are shown in their positions corresponding to high altitude flight. In this case, the divergent portion 9 is in its deployed position while the nozzle 5 is displaced axially towards the front of the propulsion system.

A rocket motor using liquid or gaseous propellants is disposed at the rear of the central body 10, i.e. in the downstream portion of the combustion chamber 4, with "downstream" being relative to the flow direction of the gas flow.

The rocket motor essentially comprises an annular combustion chamber 7 disposed in the rear portion of the central body 10 and delimitated towards the axis of the engine by a portion of the streamlined central body 8 which extends the central body 10 of the combustion chamber 4 and which constitutes a spike which penetrates into the external nozzle 5 in the throat 50 thereof while ensuring aerodynamic continuity for the stream of burning gases coming from the air-breathing combustion chamber 4.

Thus, according to an important aspect of the present invention, the rocket engine comprises an annular combustion chamber 7 having a central body 8, and the air-breathing combustion chamber 4 of the turbo jet or the ram jet is situated upstream from the combustion chamber 7 of the rocket engine, and not downstream therefrom or at the same level as in most projects for combined engines. According to the invention, the combustion chamber 7 of the rocket engine and the associated streamlined central body are thus integrated in part in the main nozzle 5 and the streamlined central body 8 penetrates into the main nozzle 5 at the throat thereof while nevertheless being shaped in such a manner as to ensure aerodynamic continuity of the air-breathing stream from the air-breathing combustion chamber 4 on its way to being ejected through the nozzle 5.

The central body 8 with its projecting tip thus ensures firstly that the combustion gases from the annular chamber 7 expand optimally over a wide range of pressures in the stream of air surrounding it, and secondly it streamlines the inside portion of the air-breathing air stream. The outlet area of the combustion chamber 7 remains small so that flow in the air stream is substantially undisturbed and there is no need to install an ejectable fairing.

The dimension of the annular outlet nozzle 70 from the rocket engine combustion chamber 7 is proportional to the width of the air-breathing chamber 4 so as to avoid significantly disturbing the flow of gases in the air stream, thus making it possible to mix the flows with a minimum of turbulence.

By changing the axial position of the main nozzle 5, it is possible to adapt the section of the air-breathing stream in the throat 50 of the main nozzle 5 as a function of the internal and external operating conditions of the engine, which conditions depend on its operating mode, which may either be turbo jet (or turbo rocket) alone, or combined turbo jet (or turbo rocket) and rocket engine, or ram jet alone, or combined ram jet and rocket engine, or rocket engine alone.

With the combined propulsion engine of the present invention, it is possible to adapt thrust continuously to requirements, and in particular it is possible to operate simultaneously in rocket mode and in turbo jet mode in order to obtain maximum thrust, e.g. during take-off, or else to change progressively from air-breathing mode to non-air-breathing mode so as to ensure that thrust is continuous and constant when leaving the dense layers of the atmosphere. In this case, the gases from the rocket engine may set up an artificial reduction in the section of the throat for the air-breathing stream, such that it is not necessary to provide the external nozzle 5 with a large stroke in order to obtain the reduction in section which is essential for operation at high altitude and high speed.

The top half-section of FIG. 1A corresponds to low altitude flight conditions, with the air-breathing nozzle 5 being in its rear position and with the tip 81 of the streamlined body 8 being situated substantially level with the throat 50 of the nozzle so as to obtain as large a flow section as possible. Simultaneously the deployable diverging portion 9 is in its retracted position.

The bottom half-section of FIG. 1B corresponds to high altitude flight conditions, with the air-breathing nozzle 5 being placed in an axial position which is offset forwards so that the throat 50 overlies a larger diameter portion of the streamlined body 8, thereby reducing the flow section of the nozzle. Simultaneously, the deployable diverging portion 9 is in its deployed position so as to increase the outlet section of the nozzle.

FIG. 2 shows a particular embodiment having a special configuration for the annular combustion chamber 7 of the rocket engine, for the outlet nozzle 70 of the rocket engine, and for the streamlined body 8 which penetrates into the external nozzle 5 and into the throat 50 thereof. In this special configuration, the annular combustion chamber 7 of the non-air-breathing rocket engine is delimitated by an outer first frustoconical wall 71 and by an inner second frustoconical wall 72, which walls are coaxial and define an annular chamber 7 with the external first frustoconical wall 71 extending at its downstream end in the form of a wall 73 forming a projection towards the outside of the annular chamber 7, and thus forming the outer wall of the nozzle 70 of the rocket engine. The inner second frustoconical wall 72 extends at its downstream end in the form of a wall portion 74 constituting a projection towards the inside of the annular chamber 7 thus forming the inner wall of the nozzle 70 of the rocket engine and being convex towards the inside of the nozzle 70.

The portion of the streamlined central body 8 extending the central body 10 of the air-breathing combustion chamber 4 and constituting a spike is itself constituted by the inner second frustoconical wall 72, by the projecting wall portion 74 forming the inner wall of the rocket engine nozzle 70, and by a curved wall 82 in the form of a tip which is concave towards the outside and which is situated in the throat 50 of the external air-breathing nozzle 5.

FIG. 3 shows another special configuration for the annular combustion chamber 7 of the rocket engine, for the outlet nozzle 70 of said rocket engine, and for the streamlined body 8 which penetrates into the throat 50 of the external nozzle 5. In this special configuration, the annular combustion chamber 7 of the non-air-breathing rocket engine is delimited by an outer first frustoconical wall 71 and by an inner second frustoconical wall 72 which are coaxial with each other and which define an annular chamber 7 whose downstream portion is further from the axis of the engine than is its upstream portion, with the outer first frustoconical wall 71 extending tangentially at its downstream end in the form of a wall portion 73 constituting the outer wall of the rocket engine nozzle 70 and being concave towards the inside of the nozzle 70. The inner second frustoconical wall 72 extends at its downstream end in the form of a wall portion 74 forming a projection towards the inside of the annular chamber 7 and forming the inner wall of the rocket engine nozzle 70 with its convex shape being directed towards the inside of the nozzle 70.

The streamlined central body 8 extending the central body 10 of the air-breathing combustion chamber 4 and constituting a spike is itself constituted by the inner second frustoconical wall 72, by the projecting wall portion 74 forming the inner wall of the rocket engine nozzle 70, and by a tip forming curved wall 82 having its concave side directed externally and situated in the throat 50 of the external air-breathing nozzle 5.

The central body of the air-breathing combustion chamber 4 is terminated at its downstream end by a portion 75 which is curved towards the axis of the engine and which is connected to the free downstream end of the wall portion 73 forming the outer wall of the rocket engine nozzle 70.

The configurations of FIGS. 2 and 3 serve to optimize the operation of the combined propulsion engine for various possible operating modes, in particular by guaranteeing continuity for the streams of burning gases and by mixing gas flows with a minimum of turbulence, in the various different axial positions of the nozzle 5.

FIG. 3 shows the distribution of gas flows when operating in combined mode, with a majority air-breathing flow A coming from the air-breathing combustion chamber 4 and represented by flow lines 141, and with a minority non-air-breathing flow B coming from the non-air-breathing combustion chamber 7 and represented by flow lines 171.

The top half-section of FIG. 4A shows the distribution of gas flows, still in the event of combined operation mode and for the same configuration as in FIG. 3, but now with a majority non-air-breathing flow B coming from the non-air-breathing combustion chamber 7 and represented by flow lines 172, together with a smaller air-breathing flow A coming from the air-breathing combustion chamber 4 and represented by flow lines 142.

The bottom half-section of FIG. 4B shows the distribution of gas flows when operating in rocket engine only mode. In this case, there is only the non-air-breathing flow C coming from the non-air-breathing annular combustion chamber 7 and represented by flow lines 173. In this operating mode, the nozzle 5 is placed in its furthest forwards axial position where the reentrant wall portion 51 delimitating its throat 50 comes into contact with the rear end 75 of the central body 10 forming the inner wall of the combustion chamber 4 so that the air-breathing stream from this combustion chamber 4 is closed off, thereby preventing hot gases from flowing bac in the wrong direction.

With reference to FIGS. 5A, 5B, and 6A, 6B, 6C, a particular embodiment of the combined engine is shown which is analogous to the embodiment of FIG. 1 but which further includes a series of moving flaps 14 disposed in a ring around the outlet from the rocket engine annular combustion chamber 7 so as to enable said outlet to be closed off selectively.

The flaps 14 are hinged on the rear end portion of the central body 10 and they may be loosely mounted. In this case they serve to close off the outlet from the combustion chamber 7 when operating in air-breathing mode (top half section of FIG. 5A and FIG. 6A), to close off the air-breathing stream (FIG. 6C) in non-air-breathing operating mode, with the flaps 14 being extended fully outwards, or else in an intermediate position (bottom half-section of FIG. 5B and FIG. 6B) to adjust the section of the throat of the air-breathing stream, with the flaps positioned merely by finding pressure equilibrium between the air-breathing jet from combustion chamber 4 and the non-air-breathing jet from combustion chamber 7. Insofar as the flaps 14 contribute to adjusting the section of the air-breathing stream through the neck of the nozzle 5, the axial stroke of the nozzle may be reduced.

A shock absorber device 91 may be associated with the loosely mounted flaps 14 in order to prevent vibration. Small actuators 15 (FIG. 6A) may also be associated with the flaps 14 in order to ensure that the flaps 14 are closed when the engine is stopped.

In a variant embodiment, the moving flaps 14 need not be loosely mounted, but may all be associated with actuators 15 disposed as shown in FIG. 6A, together with or instead of the shock absorber devices of FIG. 6C, thereby enabling the positions of the flaps 14 to be controlled continuously in order to perform the functions mentioned above of closing off the outlet from the annular chamber 7 during air-breathing mode operation on its own, of closing off the outlet from the combustion chamber 4 during a non-air-breathing mode of operation on its own, and of providing adjustment in intermediate positions during a combined mode of operation.

FIG. 7 shows a particular embodiment in which the streamlined central body with its projecting tip 8 is slightly truncated in order to enable a cooling circuit 80 to be installed inside this central body which is subjected to very high temperatures from the combustion gases from one or other of the combustion chambers 4 and 7. However, it should be observed that by making the streamlined central body 8 from thermostructural composite materials, it is possible to avoid any need for turncating it and using a cooling circuit insofar as thermostructural composite materials are intrinsically capable of withstanding high temperatures.

Figure 8A:
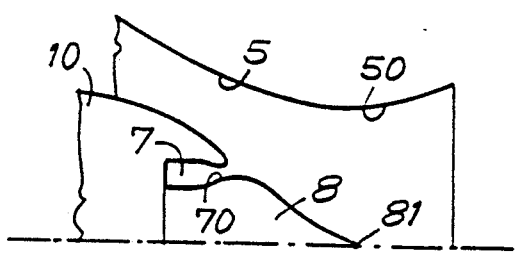
FIGS. 8A and 8B are axial sections through a portion of the FIG. 1 engine corresponding to a particular embodiment enabling the air-breathing gas stream to be shut off merely by displacing the air-breathing nozzle axially, with the top half-section of FIG. 8A showing the nozzle in its position for allowing the air-breathing gas stream to pass and with the bottom half-section of FIG. 8A showing the nozzle in its position for shutting off the air-breathing gas stream.
Figure 8B:
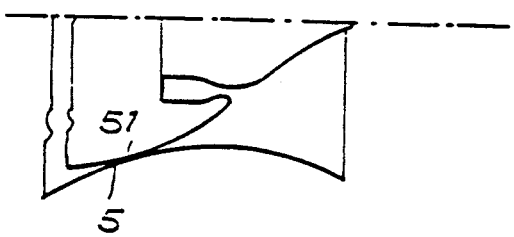

FIGS. 8A and 8B show an embodiment in which the position of the air-breathing nozzle 5 is axially adjustable over a range enabling non-air-breathing operation to take place alone (the position of the bottom half-section in FIG. 8B) with the air-breathing stream being completely shut off by tangential contact between the wall of the nozzle 5 and the central body at a point referenced 51. This prevents hot gases flowing back into the air-breathing combustion chamber 4.

Figure 9:
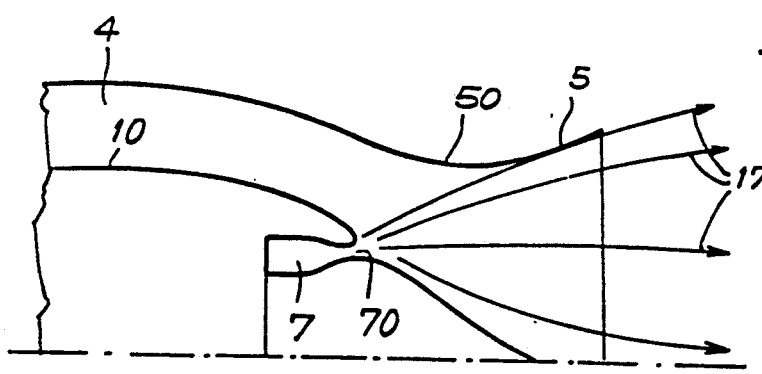
FIG. 9 is an axial half-section through a portion of the FIG. 1 engine corresponding to a particular embodiment which, in non-air-breathing operation mode, makes it possible to create a gas jet of a special configuration.

FIG. 9 shows an embodiment in which the position of air-breathing nozzle 5 is axially adjustable over a range which makes it possible to operate in non-air-breathing mode alone (with the nozzle 5 being in its position shown by solid lines in FIG. 9), so that the jet of gases from the non-air-breathing combustion chamber 7 as represented by flux lines 174 reach the external wall of the nozzle 5 tangentially, thereby avoiding the appearance of hot spots and of shock waves.

Figure 10:
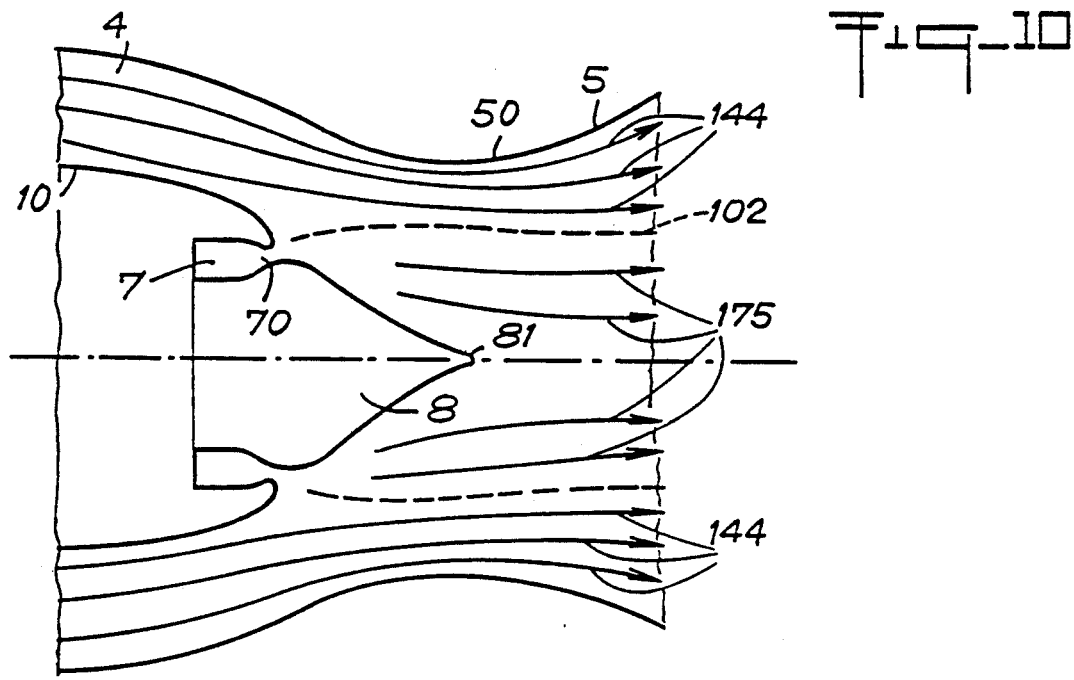
FIG. 10 is an axial section through a portion of the combined engine of FIG. 1 corresponding to a particular embodiment in which modulation of the rocket engine flow rate serves to adjust the section of the gas jet from the air-breathing combustion chamber.

FIG. 10 shows an embodiment in which the flow rate of the rocket engine is modulated so as to adapt the section of the throat 50 of the external nozzle 5 of the air-breathing stream to operating conditions. In this case, the jet of gases from the non-air-breathing combustion chamber 7 as represented by flow lines 175 occupies a central volume of the throat 50 of the external nozzle 5, with the section of said central volume being predetermined and being delimitated in FIG. 10 by dashed lines 102. The gases from the air-breathing combustion chamber 4 as represented by flow lines 144 then have only a predetermined volume available for them, with the section thereof corresponding exactly to the section theoretically required for operating under the external operating conditions of the engine. This artifical adaptation of the section of the air-breathing stream makes it possible to provide additional adjustment of the real section of the air-breathing stream in the throat 50 of the nozzle 5, thereby reducing the need to displace the nozzle 5 axially. This possibility is particularly advantageous when passing from air-breathing mode to rocket mode on leaving the atmosphere.

Figure 11:
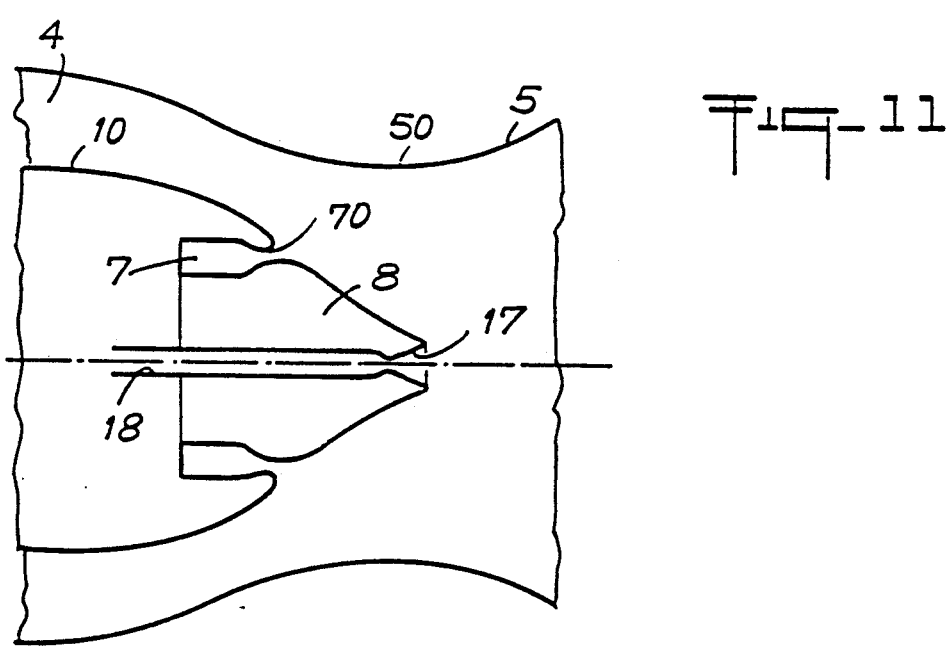
FIG. 11 is an axial section through a portion of the combined engine of FIG. 1 corresponding to a particular embodiment in which the nozzle for injecting recovered gas flows is incorporated in the truncated portion of the central body of the annular rocket engine chamber.

FIG. 11 corresponds to an embodiment in which a truncated portion of the streamlined central body 8 includes a nozzle 17 for ejecting a flow of spent gases recovered from inside the body 10 and collected in an axial duct 18 passing through the central body 10 and the streamlined central body 8. This makes it possible to recover energy which would otherwise be lost inside the central body 10.

Numerous variants of the combined engine of the present invention are possible.

For example, when operating in rocket engine mode alone, means may be provided for sweeping the air-breathing stream flowing through the air-breathing combustion chamber 4 with a flow of low temperature gas which may be partially heated in the rocket engine, or by means of the gases that are delivered by the turbines of the rocket engine turbo pumps, thereby cooling the zone of impact between the expanding jet leaving the combustion chamber 7 and the wall of the external nozzle 5, and facilitating adherence of the jet to the wall.

Similarly, when operating in air-breathing mode alone, means may be provided for sweeping the combustion chamber 7 of the rocket engine with a low temperature flow of gas in order to prevent any backflow of hot gases from the air-breathing stream.

Figure 12:
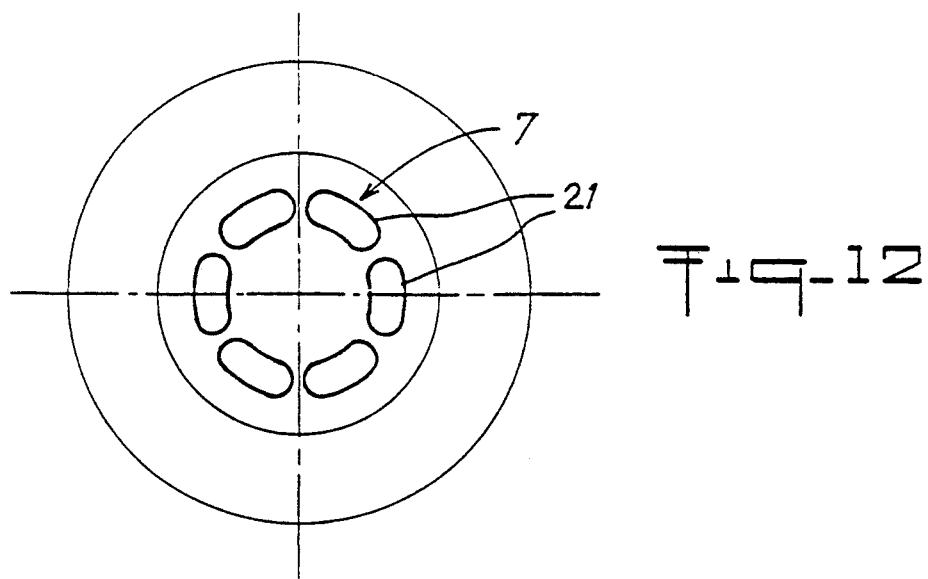
FIGS. 12 to 14 correspond to sections perpendicular to the axis of the combined propulsion engine, showing three embodiments of a segmented annular combustion chamber.
Figure 13:
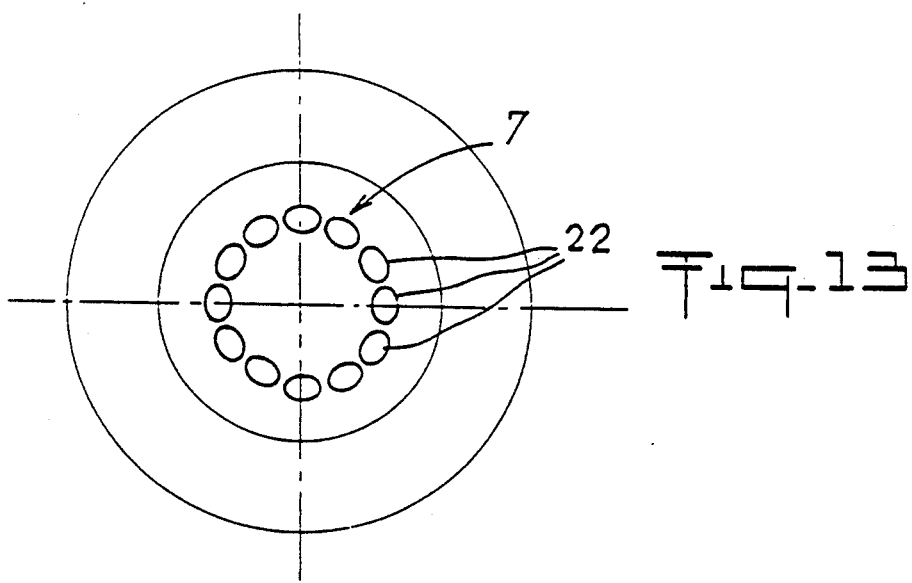
Figure 14:
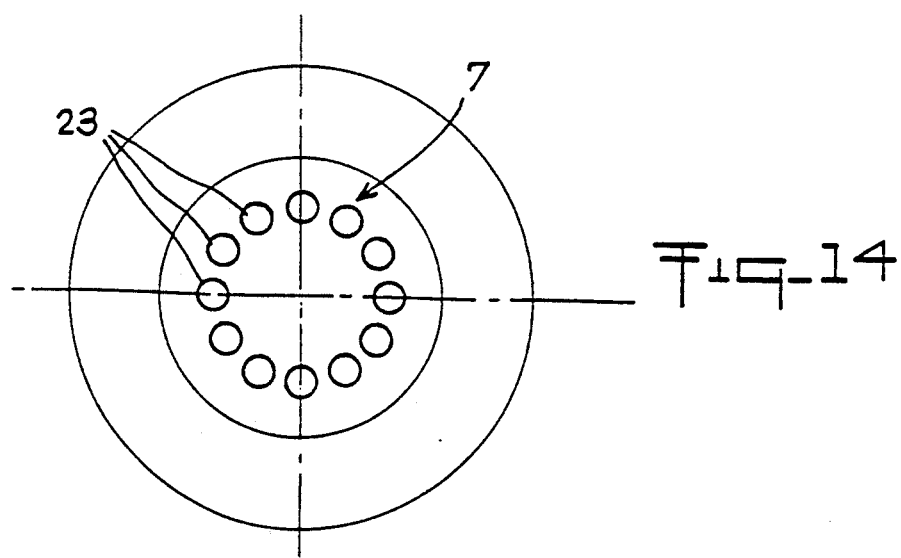

In addition, as shown in FIGS. 12 to 14, the annular combustion chamber 7 of the rocket engine may be made up from a plurality of segments in order to facilitate manufacturing the chamber.

In FIG. 12, the annular combustion chamber 7 is constituted by a plurality of individual chambers 21 each occupying an arc of a circle with the individual chambers being disposed substantially contiguously in a ring around the axis of the central body.

In FIG. 13, the annular combustion chamber 7 is constituted by a plurality of individual chambers 22 which are elliptical in section and which are disposed substantially contiguously in a ring around the axis of the central body.

In FIG. 14, the annular combustion chamber 7 is constituted by a plurality of individual chambers 23 which are circular in section and which are disposed substantially contiguously in a ring around the axis of the central body.

The individual combustion chambers of the segmented annular combustion chamber are controlled selectively and individually so that during some stages of flight only a fraction of the individual combustion chambers are in operation.

I claim:

1. A highly adaptable combined propulsion engine for an aircraft or a space-going airplane, the engine comprising a jet engine for operating in air-breathing manner in the atmosphere and a rocket engine having liquid or gaseous propellants for operating in non-air-breathing manner in space, the jet engine comprising an air inlet device and an external nozzle which, in association with a central body having a longitudinal axis, defines an air-breathing combustion chamber having an air-breathing stream of combustion gases passing therethrough, and the rocket engine comprising a non-air-breathing annular combustion chamber and at least one turbo pump for feeding the annular combustion chamber with propellant, wherein the annular combustion chamber of the rocket engine is disposed inside the central body of the jet engine, is situated in the portion downstream from the air-breathing combustion chamber in the rear portion of the central body, and is itself delimitated by a streamlined central body portion extending the central body of the air-breathing combustion chamber to constitute a spike which penetrates into the throat of the external nozzle while ensuring aerodynamic continuity of the stream of combustion gases from the air-breathing combustion chamber, and wherein means are provided for modifying the axial position of the external nozzle of the jet engine in order to adapt the flow section for the stream of combustion gases from the air-breathing combustion chamber through the throat of said nozzle to different internal and external operating conditions of the engine, the air-breathing jet engine and the non-air-breathing rocket engine being capable of operating alternately or simultaneously in combined operation, in different stages of flight.

2. A combined propulsion engine according to claim 1, wherein the jet engine comprises a turbo jet.

3. A combined propulsion engine according to claim 1, wherein the jet engine comprises a turbo rocket constituted by a turbo jet whose turbine is powered by a non-air-breathing and separate gas generator.

4. A combined propulsion engine according to claim 1, wherein the jet engine comprises a ram jet.

5. A combined propulsion engine according to claim 2, including a turbo jet capable of operating as a ram jet by cutting off the power supply to the turbine of the turbo jet's turbo compressor, such that the compressor is left free to rotate under drive from the incoming air.

6. A combined propulsion engine according to claim 1, including means for modulating the flow rate through the jet engine so as to adapt the flow section for the air-breathing stream through the throat of the external nozzle to the conditions of non-air-breathing combustion occupying a predetermined section in the throat of the external nozzle of the air-breathing stream, so as to permit the gases from the air-breathing combustion chamber to occupy only that section which is strictly necessary as a function of operating conditions external to the engine, and wherein said means for modulating the flow rate of the rocket engine include means for modifying the flow rate or the pressure of each gas flow driving a turbo pump.

7. A combined propulsion engine according to claim 1, wherein the external nozzle is adjustable along the longitudinal axis of the central body over a range enabling the non-air-breathing mode of operation on its own to cause the jet of gases from the non-air-breathing combustion chamber to reach the wall of the external nozzle tangentially, thereby preventing the appearance of hot points and of shock waves.

8. A combined propulsion engine according to claim 1, wherein the nozzle is adjustable along the longitudinal axis of the central body over a range enabling the air-breathing stream to be closed off during non-air-breathing operation mode on its own, thereby preventing hot gases from flowing back into the air-breathing combustion chamber.

9. A combined propulsion engine according to claim 1, including a ring of moving flaps loosely mounted at the outlet from the annular combustion chamber of the rocket engine in order to close off the rocket engine during jet engine operation on its own, whereas during combined operation or during non-air-breathing operation on its own the flaps are opened by the pressure difference between the inner and outer faces of the flaps.

10. A combined propulsion engine according to claim 9, wherein the ring of moving flaps further includes a shock absorber device associated with the loosely mounted flaps to prevent vibrations, together with small actuators to close the flaps when the engine is stopped.

11. A combined propulsion engine according to claim 1, including a ring of moving flaps actuated by actuators and mounted at the outlet from the anular combustion chamber of the rocket engine to close said outlet during jet engine operation on its own, thereby preventing hot gases from flowing back from the air-breathing stream and to enable the flaps to be disposed in intermediate open positions when operating in combined mode in order to minimize interactions between the air-breathing flow and the non-air-breathing flow, thereby contributing to adapting the section of the throat of the external nozzle through which the air-breathing stream flows.

12. A combined propulsion engine according to claim 11, wherein in rocket engine only operations mode, a flaps are put in the fully open position in order to close off the air-breathing combustion chamber through which the air-breathing stream flows, thereby avoiding hot gas backflow.

13. A combined propulsion engine according to claim 1, including means for use in air-breathing only operation mode to sweep the combustion chamber of the rocket engine with a low temperature gas flow in order to prevent backflow of hot gases from the air-breathing stream.

14. A combined propulsion engine according to claim 1, wherein the streamlined central body with a projecting tip delimitating the annular combustion chamber of the rocket engine is slightly truncated, and wherein a cooling circuit is disposed inside said streamlined central body.

15. A combined propulsion engine according to claim 14, wherein the truncated portion of the central body delimitating the annular combustion chamber of the rocket engine includes a nozzle for ejecting flows of trapped or spent gases collected in an axial duct passing through the central body delimitating the air-breathing combustion chamber and the central body delimitating the annular combustion chamber of the rocket engine.

16. A combined propulsion engine according to claim 1, wherein the streamlined central body having a projecting tip delimitating the annular combustion chamber of the rocket engine is made, at least in part, from thermostructural composite materials.

17. A combined propulsion engine according to claim 1, wherein the annular combustion chamber of the rocket engine is made up of a plurality of segments.

18. A combined propulsion engine according to claim 17, wherein the annular combustion chamber is constituted by a plurality of individual chambers each having a section in the form of a circular arc, said individual chambers being disposed substantially contiguously in a ring around the axis of the central body.

19. A combined propulsion engine according to claim 17, wherein the annular combustion chamber is constituted by a plurality of individual chambers each elliptical in section, which chambers are disposed substantially contiguously in a ring around the axis of the central body.

20. A combined propulsion engine according to claim 17, wherein the annular combustion chamber is constituted by a plurality of individual chambers each circular in section, which chambers are disposed substantially contiguously in a ring around the axis of the central body.

21. A combined propulsion engine according to claim 17, where a plurality of individual chambers of the segmented annular combustion chamber of the rocket engine are selectively and individually controlled so that during certain stages of flight, only a fraction of the plurality of individual chambers of the segmented annular combustion chamber of the rocket engine are in operation, whereby an important throttling capability of the rocket engine is achieved.

22. A combined propulsion engine according to claim 1, further comprising a compressor including variable pitch blades and operating parameters that are modifiable depending on flight stages.

23. A combined propulsion engine according to claim 1, further including a compressor having contrarotating rotors.

24. A combined propulsion engine according to claim 1, wherein the annular combustion chamber of the non-air-breathing rocket engine is delimitated by an outer first frustoconical wall and by an inner second frustoconical wall said walls being coaxial and defining an annular chamber having a downstream portion which is further from the longitudinal axis of the engine than its upstream portion, wherein the outer first frustroconcial wall extends tangentially, to a rocket exhaust gas flow from the annular combustion chamber, at its downstream portion in the form of a wall portion forming the outer wall of a rocket engine nozzle and being concave towards the inside of the nozzle, and wherein the inner second frustroconical wall extends at its downstream portion in the form of a wall portion projecting towards the inside of the annular chamber and forming the inner wall of the rocket engine nozzle by presenting a convex face towards the inside of the nozzle.

25. A combined propulsion engine according to claim 24, wherein the streamlined central body extending the central body of the air-breathing combustion chamber and constituting a spike comprises both said inner second frustoconical wall for which said projecting wall portion constitutes the inner wall of the rocket engine nozzle and a tip-forming curved wall having a concave face facing outward and situated in the throat of the outer air-breathing nozzle.

26. A combined propulsion engine according to claim 24, wherein the central body of the air-breathing combustion chamber terminates at its downstream end in a portion curving towards the axis of the engine and connected to a free downstream end of the wall portion constituting the outer wall of the rocket engine nozzle.

27. A highly adaptable combined propulsion engine for an aircraft or a space-going airplane, the engine comprising a jet engine for operating in air-breathing manner in the atmosphere and a rocket engine having liquid or gaseous propellants for operating in non-air-breathing manner in space, the jet engine comprising an air inlet device and an external nozzle which, in association with a central body, defines an air-breathing combustion chamber having an air-breathing stream of combustion gases passing therethrough, and the rocket engine comprising a non-air-breathing annular combustion chamber and at least one turbo pump for feeding the annular combustion chamber with propellant, wherein the annular combustion chamber of the rocket engine is disposed inside the central body of the jet engine, is situated in the portion downstream from the air-breathing combustion chamber in the rear portion of the central body, and is itself delimitated by a streamlined central body portion extending the central body of the air-breathing combustion chamber to constitute a spike which penetrates into the throat of the external nozzle while ensuring aerodynamic continuity of the stream of combustion gases from the air-breathing combustion chamber, and wherein means are provided for modifying the axial position of the external nozzle of the jet engine in order to adapt the flow section for the stream of combustion gases from the air-breathing combustion chamber through the throat of said nozzle to different internal and external operating conditions of the engine, and wherein means are provided for sweeping the air-breathing stream running through the air-breathing combustion chamber while operating in rocket engine only mode with a flow of low temperature gas in order to cool a zone of impact of the expanding jet leaving the combustion chamber of the rocket on the wall of the external air-breathing nozzle, and in order to facilitate adhesion of said jet on said wall, wherein the means for sweeping comprises means for injecting a flow of fuel into the air-breathing stream, which fuel may optionally be partially heated by the rocket engine, the air-breathing jet engine and the non-air-breathing rocket engine being capable of operating alternately or simultaneously in combined operation, in different stages of flight.

28. A highly adaptable combined propulsion engine for an aircraft or a space-going airplane, the engine comprising a jet engine for operating in air-breathing manner in the atmosphere and a rocket engine having liquid or gaseous propellants for operating in non-air-breathing manner in space, the jet engine comprising an air inlet device and an external nozzle which, in association with a central body, defines an air-breathing combustion chamber having an air-breathing stream of combustion gases passing therethrough, and the rocket engine comprising a non-air-breathing annular combustion chamber and at least one turbo pump for feeding the annular combustion chamber with propellant, wherein the annular combustion chamber of the rocket engine is disposed inside the central body of the jet engine, is situated in the portion downstream from the air-breathing combustion chamber in the rear portion of the central body, and is itself delimitated by a streamlined central body portion extending the central body of the air-breathing combustion chamber to constitute a spike which penetrates into the throat of the external nozzle while ensuring aerodynamic continuity of the stream of combustion gases from the air-breathing combustion chamber, and wherein means are provided for modifying the axial position of the external nozzle of the jet engine in order to adapt the flow section for the stream of combustion gases from the air-breathing combustion chamber through the throat of said nozzle to different internal and external operating conditions of the engine, further including a deployable diverging portion connected to the air-breathing external nozzle and provided with for controlling deployment of the deployable diverging portion, the air-breathing jet engine and the non-air-breathing rocket engine being capable of operating alternately or simultaneously in combined operation, in different stages of flight.

29. A highly adaptable combined propulsion engine for an aircraft or a space-going airplane, the engine comprising a jet engine for operating in air-breathing manner in the atmosphere and a rocket engine having liquid or gaseous propellants for operating in non-air-breathing manner in space, the jet engine comprising an air inlet device and an external nozzle which, in association with a central body, defines an air-breathing combustion chamber having an air-breathing stream of combustion gases passing therethrough, and the rocket engine comprising a non-air-breathing annular combustion chamber and at least one turbo pump for feeding the annular combustion chamber with propellant, wherein the annular combustion chamber of the rocket engine is disposed inside the central body of the jet engine, is situated in the portion downstream from the air-breathing combustion chamber in the rear portion of the central body, and is itself delimitated by a streamlined central body portion extending the central body of the air-breathing combustion chamber to constitute a spike which penetrates into the throat of the external nozzle while ensuring aerodynamic continuity of the stream of combustion gases from the air-breathing combustion chamber, and wherein means are provided for modifying the axial position of the external nozzle of the jet engine in order to adapt the flow section for the stream of combustion gases from the air-breathing combustion chamber through the throat of said nozzle to different internal and external operating conditions of the engine, and wherein means are provided for sweeping the air-breathing stream running through the air-breathing combustion chamber while operating in rocket engine only mode with a flow of low temperature gas in order to cool a zone of impact of the expanding jet leaving the combustion chamber of the rocket on the wall of the external air-breathing nozzle, and in order to facilitate adhesion of said jet on said wall, the air-breathing jet engine and the non-air-breathing rocket engine being capable of operating alternately or simultaneously in combined operation, in different stages of flight.

30. A combined propulsion engine according to claim 29, wherein the means for sweeping comprises means for injecting gases that come from the turbines of the turbo pumps of the rocket engine into the air-breathing stream.

* * * * *